United States Patent
Rogatnev

[11] Patent Number: 6,039,365
[45] Date of Patent: Mar. 21, 2000

[54] SEAL-LOCKING MECHANISM

[76] Inventor: Nikolai Timofeevich Rogatnev, Russian Federation, Moscow, ulitsa Palekhskaya, 11, kv.50, Russian Federation

[21] Appl. No.: 08/913,540
[22] PCT Filed: Jan. 26, 1996
[86] PCT No.: PCT/RU96/00015
   § 371 Date: Sep. 17, 1997
   § 102(e) Date: Sep. 17, 1997
[87] PCT Pub. No.: WO97/27574
   PCT Pub. Date: Jul. 31, 1997
[51] Int. Cl.[7] .................................... E05B 39/02
[52] U.S. Cl. .......................... 292/327; 292/318
[58] Field of Search ............... 292/307 R, 318, 292/319, 328, 329, 327; 24/136 R, 596, 617; 411/14, 5, 383, 267, 270, 338, 339, 433

[56] References Cited

U.S. PATENT DOCUMENTS

| | | |
|---|---|---|
| 639,937 | 12/1899 | Richardson . |
| 1,512,632 | 10/1924 | O'Connor ................................ 292/327 |
| 1,682,396 | 8/1928 | Miller ..................................... 292/318 |
| 1,908,241 | 5/1933 | Heeren ................................... 292/327 |
| 3,157,215 | 11/1964 | Zahodiakin . |
| 3,561,317 | 2/1971 | Rowell ....................................... 85/61 |
| 4,626,009 | 12/1986 | Burnett . |
| 4,826,027 | 5/1989 | Nilson ................................ 292/307 R |
| 4,945,738 | 8/1990 | Blair ....................................... 292/327 |
| 5,116,091 | 5/1992 | Swift ....................................... 292/318 |
| 5,234,300 | 8/1993 | Fluckiger ................................. 411/383 |
| 5,664,921 | 9/1997 | Leslie ..................................... 411/427 |
| 5,732,989 | 3/1998 | Stevenson ................................ 292/327 |

FOREIGN PATENT DOCUMENTS

| | | |
|---|---|---|
| 86 771 | 5/1921 | Germany ................................ 292/327 |
| 1288747 | of 1987 | Russian Federation . |
| 2 175 254 | of 1985 | United Kingdom . |
| 2 256 618 | 12/1992 | United Kingdom .................. 292/326 |

Primary Examiner—Darnell M. Boucher
Assistant Examiner—Gary Estremsky
Attorney, Agent, or Firm—Nath & Associates; Gary M. Nath; Gregory B. Kang

[57] ABSTRACT

A seal-locking mechanism is intended for seal-locking of railway wagons and containers and other objects such as, for example, warehouses, depots, shops, tanks, hatches and automobiles.

The seal-locking mechanism comprises a body 1, a locking element 3 having unilaterally beveled serrations 6 contacting, when locking, with respective serrations made on separate fixing elements 7 located in the body 1 over conical surfaces and spring-loaded with respect to said body. The seal-locking mechanism may be provided with a cap 13 which, when locating on the body 1, results in the formation of a single cylindrical surface of the seal-locking mechanism. The locking element 3 is made i nthe form of a cylindrical rod having a head 4 in close proximity to which, on a its lateral surface, there is provided a ring-shaped boring 11. A required information is applied to the face of the head 4 of the locking element 3.

2 Claims, 1 Drawing Sheet

SEAL-LOCKING MECHANISM

TECHNICAL FIELD

The present invention relates to a seal-locking mechanism intended for seal-locking of railway wagons and containers and other objects such as, for example, warehouses, depots, shops, trade pavillions, tanks, etc., and may be used for seal-locking of cargo transportable in railway wagons and containers, trucks and other transportation means, for seal-locking of hatches of, for example, refrigerators, grain freighters, vans and other automobiles.

BACKGROUND ART

The closest prior art has been described in the device according to USSR Inventors' Certificate No. 1288747, Int.Cl. G 09 F 3/03, 1984, which comprises a body with a head, a fixing and a locking element, wherein the fixing element is made in the form of a case and a stop, the locking element is made in the form of a spring.

Of the major drawbacks of said device is a complexity of its manufacture associated with a complicated threading inside a nut. Moreover, the use of a specific tool is needed to lock the device, which is inconvenient during use; the more so, as it is necessary to simultaneously hold up the nut and the casing with one hand on the inside of a lug of an object being locked, whereas the other hand serves to apply a specific tool to a body's head on the outside of said lug of an object being locked. The known device is of no use during possible displacement of a lug in railway wagons and can not be used for seal-locking of cargo transportable in railway wagons and containers. Its individual manufacture is needed for using in objects with different dimensions of lugs and distances between them, which creates difficulties and drawbacks during operation.

SUMMARY OF THE PRESENT INVENTION

The present invention is made in order to solve the above problems included in the prior arts, and an object of this invention is to provide a seal-locking mechanism which, as compared to previously known devices of the same purpose, allows simplification of the manufacturing process, convenience and reliability during service and is re-usable when replacing only one part.

The aforementioned advantages of the seal-locking mechanism are provided in accordance with the present invention in which a locking element is made in the form of a cylindrical rod having a sharpened end on one side and a head on the other side, wherein a part of a lateral surface of the cylindrical rod is made with unilaterally beveled serrations, a fixing element is made in the form of at least two separate elements with an outer conical surface which conforms an inner conical surface made in a body and an inner surface on which unilaterally beveled serrations are made to contact with respective serrations of the locking element, said fixing elements are spring-loaded with respect to the body, a required information is applied to the face of the locking element head in close proximity to which, on a smooth cylindrical surface of the locking element, there is provided a ring-shaped boring, a cylindrical bushing is mounted above said boring with the possibility of turning over.

Besides, the present seal-locking mechanism may be provided with a cap made with an outer cylindrical surface and a head which conform the outer cylindrical surface and the head of the body, said cap may be located on the body over bearing surfaces provided on the body and on the cap with the formation of a single outer cylindrical surface of the seal-locking mechanism, and the cap head comprises an inner cavity to locate therein said locking element head.

The present invention will now be more particularly described, by way of example, with reference to the drawings in which.

Figure 1:
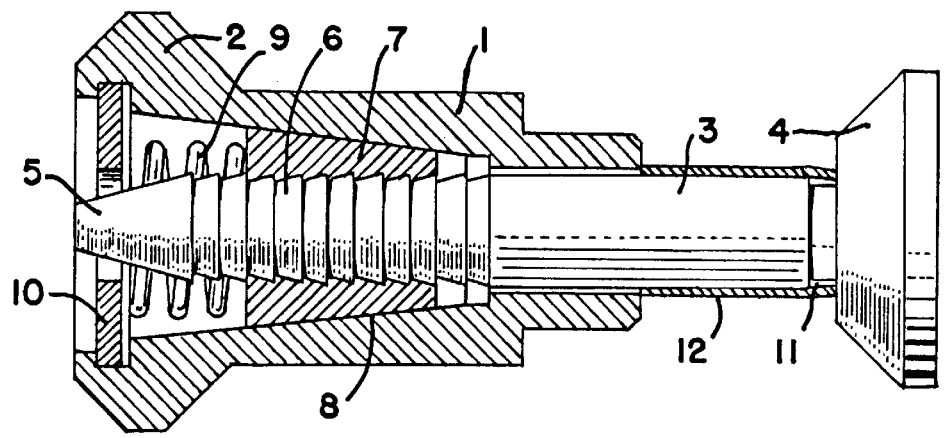
FIG. 1 shows an embodiment of the seal-locking mechanism.
Figure 2:
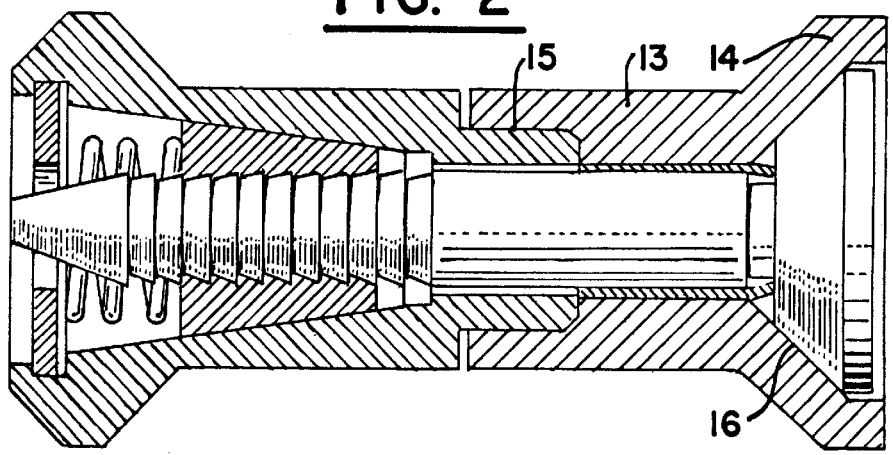
FIG. 2 shows the same embodiment, but having an additional cap.
Figure 3:
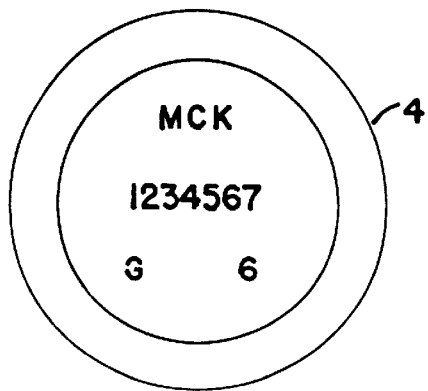
FIG. 3 shows a top view of the of the seal-locking mechanism.
Figure 4A:
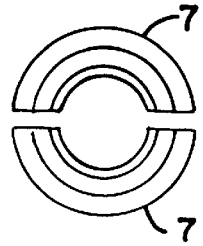
FIG. 4 shows a top view of the fixing means and a cross-sectional view of the fixing means.
Figure 4B:
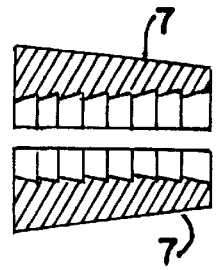

Referring now to the drawings, there is shown a view of the present invention, which comprises a body 1 with a head 2, a locking element 3 made in the form of a cylindrical headed rod 4 with a sharpened end 5 and with unilaterally beveled serrations 6, a fixing element 7 made in the form of at least two separate elements with an outer conical surface 8 which conforms an inner conical surface of the body 1, wherein unilaterally beveled serrations which conform unilaterally beveled serrations 6 of the locking element 3 are made on an inner surface of each fixing element 7. Said fixing elements 7 are spring-loaded with respect to the body 1 by means of a spring 9 and a washer 10 fixed with respect to the body 1. A required information is applied to the face of the head 4 of the locking element 3. In close proximity to the head 4, on a smooth cylindrical surface of the locking element 3, there is provided a ring-shaped boring 11 above which a cylindrical bushing 12 is mounted with its one end being slightly rolled in the ring-shaped boring 11, said cylindrical bushing 12 is located on the lateral surface of the locking element 3 freely, with the possibility of turning over. In accordance with the present invention the seal-locking mechanism may be provided with a cap 13 made with an outer cylindrical surface and a head 14 which conform the outer cylindrical surface and the head 2 of the body 1. Said cap 13 is located on the body 1 over bearing surfaces 15 provided on the cap 13 and on the body 1 with the formation of a single outer cylindrical surface of the body 1 and the cap 13. A maximal clearance between the abutting faces of the body 1 and the cap 13 may be determined by the pitch of a thread on the locking 3 and fixing 7 elements. In the head 14 of the cap 13, there is provided an inner cavity 16 which conforms the head 4 of the locking element 3 to locate said head in this cavity when locking.

BEST MODE FOR CARRYING OUT THE INVENTION

The seal-locking mechanism is used as follows.

Beforehand, fixing elements 7 are installed in a body 1 and are spring-loaded by means of a spring 9 and a washer 10 which is rigidly fixed with respect to the body 1 making it possible to create a nonseparable, re-usable construction. Thereupon, the body 1 with the fixing elements 7 is passed through lugs with one hand, whereas the other hand serves to insert into the body a locking element 3 with its sharpened end misaligning the fixing elements 7 along the longitudinal axis of the seal-locking mechanism. Said fixing element 7, while moving apart, allow passing of the locking element 3 in the body 1 up to the moment of contact between unilaterally beveled serrations of the fixing elements 7 and similar serrations of the locking element 3.

Also beforehand, a cylindrical bushing 12, which end may be slightly rolled in a ring-shaped boring 11 made in close proximity to a head 4 of the locking element 3, is set on a cylindrical surface of the locking element 3 freely, with the possibility of turning over. The presence of such cylindrical bushing 12 creates an additional degree of protection in the case of unauthorized opening, for example, when attempting to saw up the locking element 3, since in this case the cylindrical bushing 12 will turn over and prevent such a sawing up. The ring-shaped boring 11 provided in close proximity, that is to say at the base of the head 4 of the locking element 3, allows determination of a purposely provided place of breaking-off the head 4 during an unauthorized opening of the seal-locking mechanism and allows definition of the breaking-off force with a structural determination of dimensions of said ring-shaped boring 11.

If necessary, the seal-locking mechanism additionally comprises a cap 13 which, in the same way as the fixing elements 7, is pre-set on the body 1 over bearing surfaces 15. Provision of the seal-locking mechanism with the cap 13 makes it possible to ensure a superior reliability of locking by the expense of strengthening the structure and allows the use for the purpose of locking various objects with lugs having fixed dimensions determined, in each particular case, by a total cylindrical surface of the body 1 and the cap 13.

When closed, all elements of the seal-locking mechanism form a rigid construction. To open it, a considerable force is needed to be applied which requires the use of a special equipment, whereas its closure is effected by hand, without need of specific experience and tool. When opening, only the locking element 3 in its purposely weakened part is destroyed, and a remaining part of said locking element 3 is then freely pushed out of the body. The rest parts of the seal-locking mechanism are re-usable, enabling one to reduce costs both for the manufacture and use.

What is claimed is:

1. A seal-lock comprising:

a body having a head portion and a substantially cylindrical portion, said head portion and said cylindrical portion being situated substantially along a longitudinal axis of the seal-lock, said cylindrical portion defining an outer cylindrical surface of said body;

a longitudinal opening in said body, said opening having a substantially cylindrical portion and a substantially conical portion, said conical portion being an inner conical portion and thereby defining an inner conical surface of said body;

a fixing element in the form of at least two separate elements, each capable of being moved along said longitudinal axis of the seal-lock and moved apart from each other in a radial direction of the seal-lock, said separate elements all together forming a substantially frustro-conical body, having an outer surface thereof defining an outer surface of said fixing element, said fixing element being situated inside said inner conical portion of said body, said separate elements of said fixing element being spring-loaded against said inner conical portion of said body such that said outer surface of said fixing element is of a shape that will mate to said inner conical surface of said body;

a shaped longitudinal through opening in said fixing element, said shaped longitudinal through opening being situated substantially along said longitudinal axis of the seal-lock and defining an inner surface of said fixing element, said inner surface having unilaterally beveled serrations;

a locking element having a head portion with a face, a substantially cylindrical middle portion, and a sharpened end, said head portion, middle portion, and sharpened end being situated substantially along said longitudinal axis of the seal-lock, a part of said cylindrical middle portion of said locking element having unilaterally beveled serrations which, when said locking element is inserted into said longitudinal opening in said body, matingly engage with said corresponding unilaterally beveled serrations of said fixing element to lock said locking element and hold said cylindrical middle portion of said locking element inside said shaped longitudinal through opening in said fixing element;

a reduced diameter annular undercut located adjacent to said head portion of said locking element;

a cylindrical bushing rotatably mounted on said locking element covering said undercut;

an information located on said face of said head portion of said locking element;

a cap having a head portion and a substantially cylindrical portion embracing said locking element, said cylindrical portion of said cap defining an outer cylindrical surface thereof and being substantially aligned with said outer cylindrical surface of said body, said head portion of said cap having an inner cavity for receiving said head portion of said locking element; and wherein the seal-lock can be removed by breaking the locking element at its annular undercut such that the body and cap can be reused.

2. A seal-lock comprising:

a body with a head;

a locking element characterized in that said locking element is made in the form of a cylindrical rod having a sharpened end and a head on another end thereof, a part of a cylindrical surface of said cylindrical rod is provided with unilaterally beveled serrations, and another part of said cylindrical surface of said cylindrical rod being smooth;

a fixing element characterized in that said fixing element includes at least two separate elements, each of which has an outer conical surface mating with an inner conical surface of said body, and an inner surface provided with unilaterally beveled serrations mating with corresponding unilaterally beveled serrations of said locking element, said separate elements being spring-loaded against said body and moving apart while locking to allow said locking element to move into engagement of its unilaterally beveled serrations with the corresponding unilaterally beveled serrations of said separate elements;

a face of said locking element having a required information;

a reduced diameter annular undercut located on said locking element on its smooth cylindrical surface adjacent to said head;

a cylindrical bushing rotatable mounted on said locking element covering said undercut; and a cap having a head and a cylindrical portion embracing said locking element, said cylindrical portion of said cap defining an outer cylindrical surface thereof and being aligned with an outer cylindrical surface of said body, said head of said cap having an inner cavity for receiving said head of said locking element.

* * * * *